United States Patent [19]

Nakamori

[11] 3,846,834

[45] Nov. 5, 1974

[54] CARTRIDGE LOCKING AND EJECTING MECHANISM

[75] Inventor: Shinji Nakamori, Soka, Japan

[73] Assignee: Clarion Co., Ltd., Tokyo, Japan

[22] Filed: May 1, 1972

[21] Appl. No.: 248,807

[30] Foreign Application Priority Data

Apr. 30, 1971 Japan ............................. 46-33651

[52] U.S. Cl. ....................... 360/93, 242/198, 352/74

[51] Int. Cl. ... G11b 5/00, G11b 15/32, G11b 23/04

[58] Field of Search ......... 274/4 B, 4 F, 11 B, 11 C; 242/198; 352/74

[56] References Cited

UNITED STATES PATENTS

| | | | |
|---|---|---|---|
| 3,485,500 | 12/1969 | Loeschner | 274/11 B |
| 3,599,985 | 3/1969 | Huber | 274/4 B |
| 3,617,065 | 11/1971 | Camras | 274/4 B |
| 3,684,299 | 8/1972 | Clark | 274/4 B |

*Primary Examiner*—Leonard D. Christian
*Attorney, Agent, or Firm*—William Anthony Drucker

[57] ABSTRACT

At the entry side of a tape player, or recorder holding arms are arranged which include supports for the cartridge and a releasing portion whose end portion is outside of the tape player. The cartridge, charged ready for reproduction, is easily and smoothly extracted by simply touching the releasing portion.

10 Claims, 7 Drawing Figures

CARTRIDGE LOCKING AND EJECTING MECHANISM

OUTLINE OF INVENTION

The invention relates to a cartridge locking and ejecting mechanism for a tape player.

Generally, a tape cartridge is charged and fixed in a tape player and then a tape is fed for reproduction. Several parts arranged in the tape player are operated by inserting this cartridge, for example operation of a pinch roller, vertical movement of an elevator, switchings or lockings. Those parts are furnished with elastic materials to support the inserted cartridge at the fixed position. In this case, discharging of such a set cartridge is effected against the supporting forces of said parts, and this discharge by the fingers is not easy, because as well known an arrangement of the cartridge exactly presses a tape in the cartridge to the reproduction head in the player and presses a pinch roller to the capstan at the determined pressure so that the driving force by said capstan is securely given to the tape to be fed. Especially in such a type of the cartridge which is formed with fitting grooves at its both sides for which corresponding fitting portions are mounted, since this cartridge is rigidly held to the player with said both sides, the extraction is fairly difficult. Although it is well known that the stable reproducing relation is contributed to a strong holding, the enough holding force has not been taken for such reason. Accordingly, in the foregoing arts the reproducing relation is not always stable, and therefore a concave is formed in the cartridge to take a pinch for extraction to bring about complicated and unneat structure.

The invention has been devised to cancel such disadvantages, shortcomings or defects of the foregoing arts, and the basic object of the invention is to release a setting of the cartridge by easy operation, by which the cartridge is easily removed and the convenience thereby would be greatly produced, and the very strong force may be taken for charging and holding the cartridge in the player to thus bring about the stable reproducing condition and maintain the exact tape feed and the reproducing relationship.

A further object of the invention is to extract the set cartridge appropriately. It is, if possible, preferable that the inserted cartridge is not out of the tape player for better appearance not to catch the operator with sleeve. But if this is the case, it is not easy to extract the cartridge, and actually the reproduction is performed as the cartridge is out of the player. The invention is to also cancel this respect. The cartridge may be ejected from setting and holding appropriately, thereby to remove difficulties at discharging.

Another object is to carry out said extraction by one touching. According to the invention, even in a push button system or switching lever system said discharging may be done by using the simultaneously recovering force of spring. This releasing is exact without troubles. In Hi Pac system, fitting projections to the both sides of the cartridge are released concurrently with ease.

Many other features, concrete composing relationship or working effects will be understood through explanations of embodiments.

BRIEF EXPLANATION OF DRAWINGS

The attaching drawings show embodiments of discharging mechanism of a tape cartridge according to the invention, in which.

DETAILED EXPLANATION OF INVENTION

Figures 1, 2:
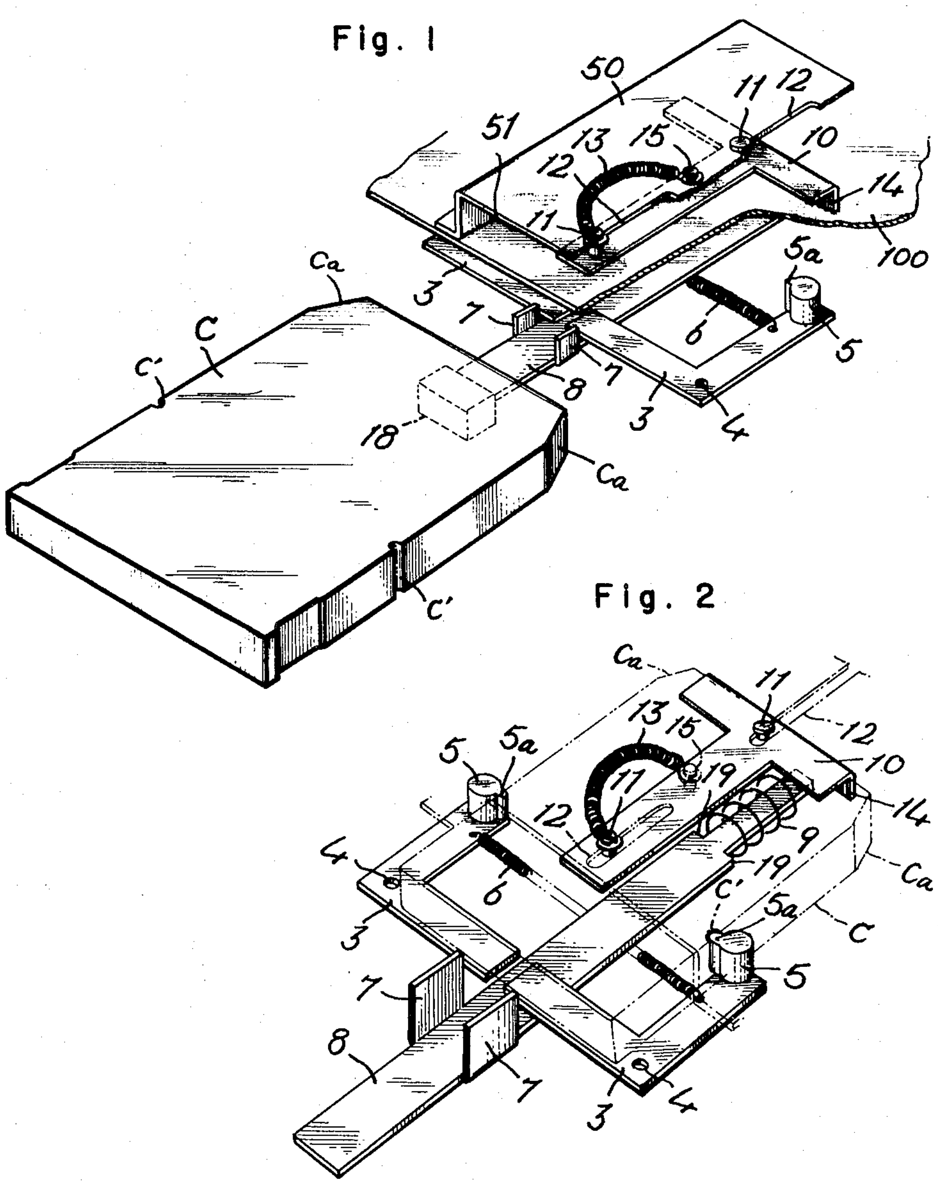
FIG. 1 is perspective views, partially in section, of a discharging mechanism and a tape cartridge, showing one embodiment.
FIG. 2 is also a perspective view showing the composing members of the above.
Figure 3:
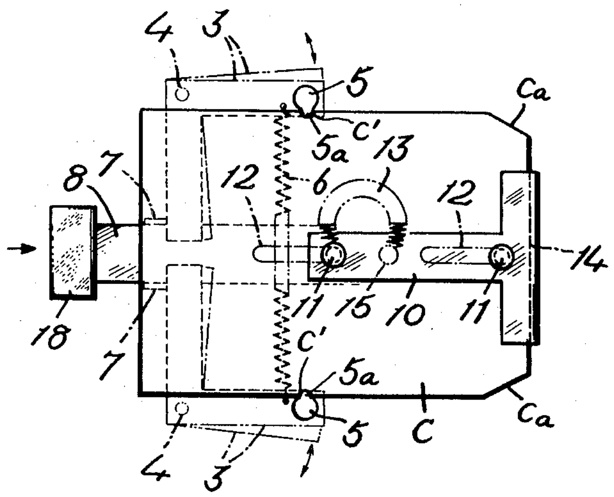
FIG. 3 is a plan view showing the cartridge inserted.

Explanation will be given with reference to the attaching drawings. On a deck 100 furnished with a motor, flywheel, reproduction head and others as known, there is as seen in FIG. 1 provided a locking frame 50 which forms at its one side an opening 51 for a cartridge C, while under said deck 100 a pair of locking arms 3, 3 are symmetrically equipped correspondingly to the providing positions of the holding frame 50. These holding arms 3, 3 in FIGS. 1 to 3 are L-shaped and are rotatably furnished at pivots 4. The locking arms 3, 3 have respectively supporters 5 with fitting projections *5a*, and an elastic member 6 is equipped as shown in FIG. 2. Such supporters 5, 5 project above the deck 100 through holes 105 to fit at least projections *5a* into corresponding notches c′ formed in the sides of the cartridge C. In this connection, at least one of the supporters 5 may be a rotor, by which setting and unsetting of the cartridge are smoothly provided, especially such a rotor can be used for Lear Jet on Federi Pac type tape cartridge which are known in winding the tape onto one reel in endless state.

In FIGS. 1 to 4 there is within the holding frame 50 providec a T-shaped slidable member 10 whose end portion is bent downwards into L-shape to form an engaging part 14 for a front apart of the cartridge C. Also in FIGS. 1 to 4, two guides 11, 11 are projected on the slidable member 10 and are placed in guiding oblong holes 12. Another elastic material 13 is provided between the guide 11 and a stopper 15 fixed on the slidable member 10. There is provided a releasing lever 8 having engaging steps (19) and arranging a returning spring (9) thereon, at the basic portions of said locking arms 3, 3, the both sides of which are bent to form fitting protrudes 7, 7 facing ends of the bases of the locking arms 3, and a controlling part 18 at the end portion of the releasing lever 8 is controlled to move the locking arms 3 against tension of said elastic material 6.

Figure 4:
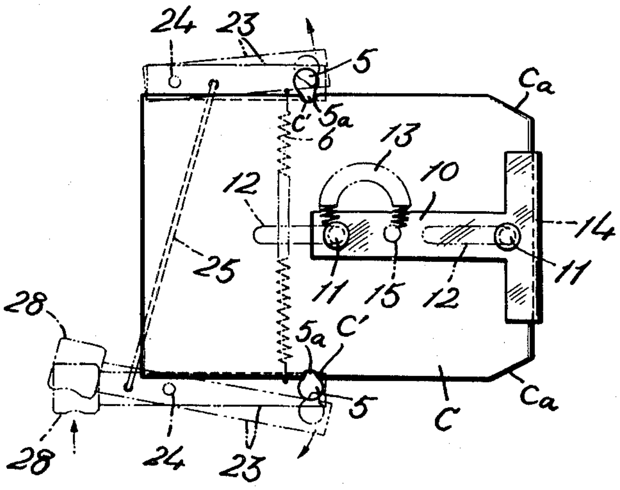
FIG. 4 is also a plan view of a further embodiment of the invention.

The structure shown in FIGS. 1 to 3 may be modified as shown in FIG. 4. That is, locking arms 23, 23 which are provided with pivots 24 on the deck 100 are used instead of said arms 3, 3, and these locking arms 23, 23 are furnished with the supporters 5, 5 at these ends in the same way as said above, but the arm 23 of the one side extends than said pivot 24 to have operating part 28, and a cooperating rod 25 is provided between the arms 23 of both sides in such a manner of one being at the front side than the pivot 24 and the other being at the back than the pivot 24. The structural relations as to the slidable member 10 and the elastic material 13 are the same as shown in FIGS. 1 to 3. An adoption of such a structure does not necessitate any longer at least the returning lever 8 in comparison with that of FIGS. 1 to 3, and the respective locking arms 23 may be simplified which will be apparent from the comparison of FIGS. 3 and 4.

Figure 6:
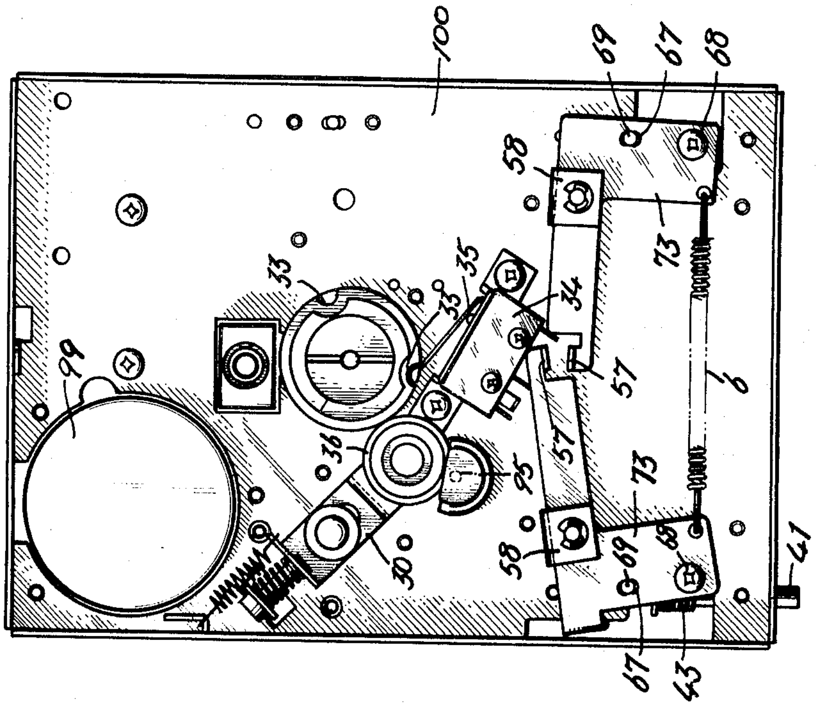
FIG. 6 is a bottom of the above.
Figure 5:
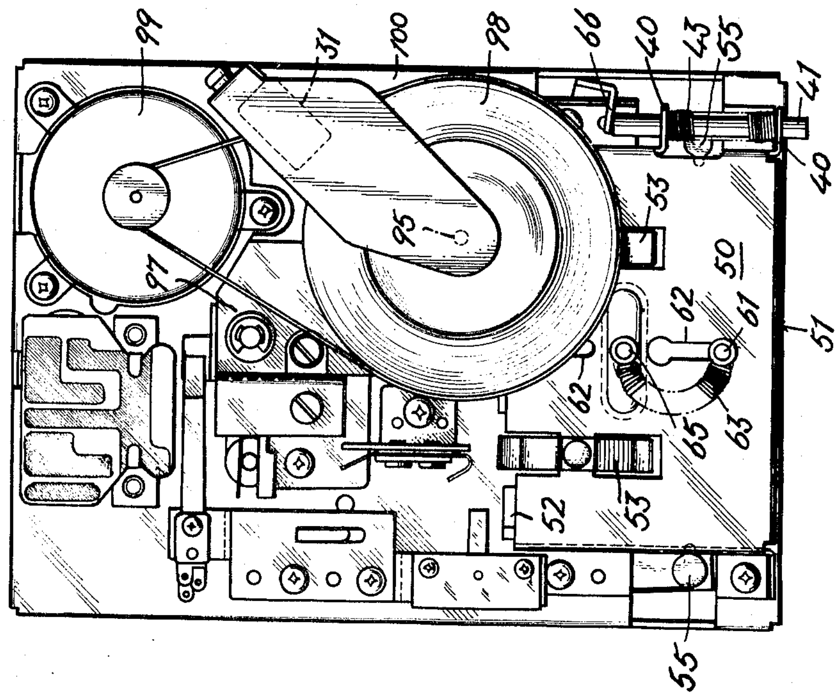
FIG. 5 is, too, a plan view showing another embodiment.
Figure 7:
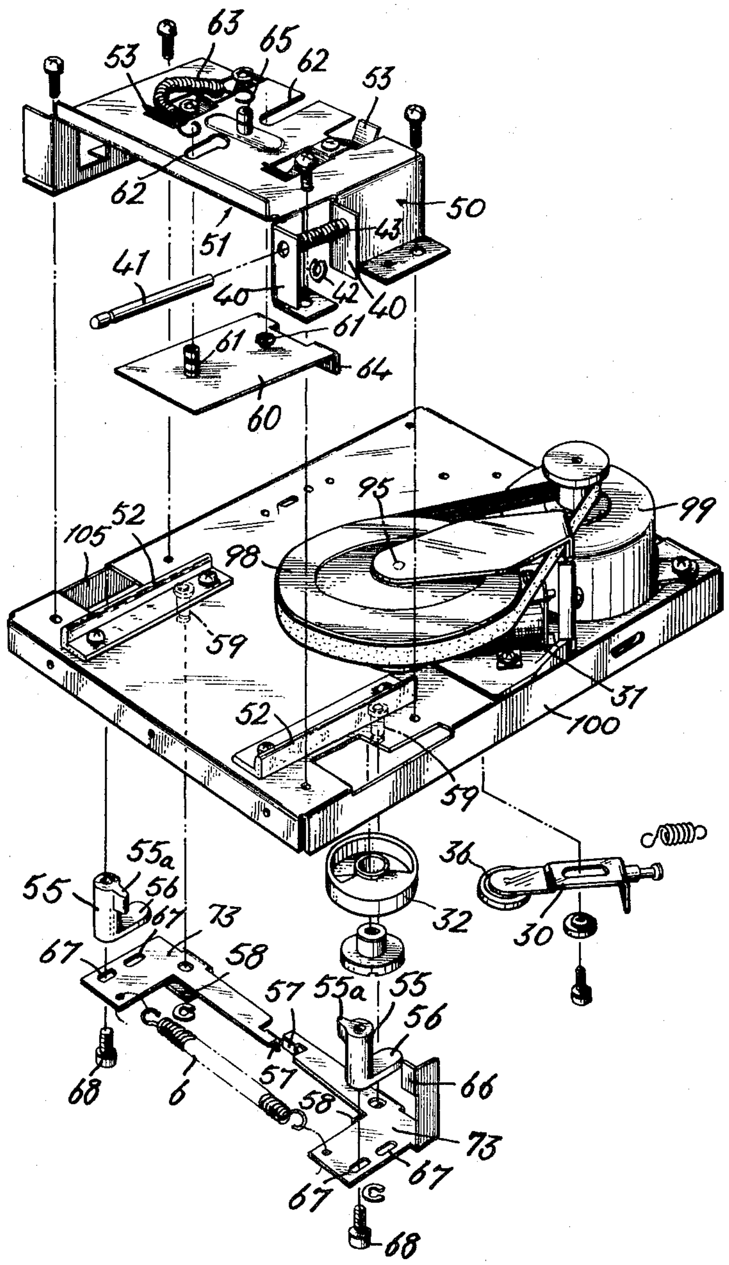
FIG. 7 is perspective views decomposing the main composing members.

Furthermore, other actual embodiments of the invention are shown in FIGS. 5 to 7. FIG. 5 is a plan view the whole set-up state, FIG. 6 is the bottom thereof and FIG. 7 is perspective view illustrating the decomposed state of the element parts. There are, on the deck 100, arranged a motor 99, flywheel 98 and a reproduction head supporting mechanism 97, and this deck 100 is at its front side provided with a holding frame 50 having an entry 51 for cartridge C in which rails 52 are laid to guide the cartridge C. Said holding frame 50 is equipped with elastic plates 53 pressing the cartridge from the upper, and is at its center formed with guiding holes 62, 62 at the center of which a projection 65 is fixed and into which guides 61, 61 of a slidable member 60 are mounted, the slidable member 60 to be furnished in the holding arm 50 being bent 64 at its end portion, and an elastic material 63 is equipped between said projection 65 and one guide 61 to always give the slidable member 60 a returning action as is in FIGS. 1 to 3 and 4. Under the deck 100 a pair of locking arms 73, 73 are arranged symmetrically and end portions of these locking arms 73, 73 are bent downwards to form portions 57 engaging each other as shown in FIG. 7. Further the central parts of these arms 73 bent in L-shape is partially bent in U-shape of section to form pivot seats 58 so that these seats 58 are rotatably pivoted onto pivots 59 projecting from the bottom of the deck 100 to support the locking arms 73, 73 at the appropriate height from the deck side. A tension spring 6 is provided between end portions of the both arms 73, 73 as in the above embodiments, and supporters 55 having fitting projections 55*a* are fixed thereon. The supports 55 are made of synthetic resin in this embodiment and seats 56 are formed continuously thereto. The position is decided at these seats 56 by making use of holes 67, 67 of the arms 73 with stoppers 68 and projections 69 on the bottoms of the seats 56. Further, one holding arm 73 is formed with a receiving portion 66 to which an end portion of releasing rod 41 faces, this releasting rod 41 being equipped in supporting parts 40, 40 at one side of the holding frame 50, being furnished with a spring 43 whose one end is held by a ring 42 to always effect a returning action to said releasing rod 41 and being provided with pushbutton or other operating parts.

In the embodiments shown in FIGS. 5 to 7, a rotation of a shaft of the capstan provided on the flywheel 98 is utilized to shift the position of the reproduction head for which as shown in FIG. 6 a friction pulley 36 on a movable member 30 is provided to a rotary shaft 95 of said flywheel 98. This movable member 30 goes towards a rotary shaft 95 and a rotary wheel 32 by means of a plunger 31 which is moved with a known head position shifting signal. A circumference of the rotary wheel 32 is formed with concaves 33, 33 as shown in FIG. 6, and an operating piece 35 of a switch 34 is arranged to this circumference, and a known head shifting cam acting on a reproduction head supporting mechanism 97 is provided coaxially or cooperatively with said rotary wheel 32. That is, when an electric current is passed to the plunger 31 by the head shifting signal, the movable member 30 is acted so that the friction pulley 36 is contacted to the rotary wheel 32 and rotary shaft 95, and the rotation of inertia of the flywheel 98 push up the operating piece 35 in one concave 33 and shift a switch to ON and to subsequently provide a rotation of the flywheel 98, thereby shifting the position of the tape truck of the reproduction head. When shifting of the position is finished said operating piece 35 drops into another concave 33 to release the switch 34. In the prior art the head is shifted by action of the plunger, while according to the invention the plunger receives the signal to only coperate the movable member 30, and an output for the plunger 31 is very low.

To explain the working of the invention, in FIGS. 1 or 3 when the cartridge is not yet inserted, the slidable member 10 is as shown in FIG. 1 returned back to the entry side of the holding frame 50 by the elastic material 13 and the locking arms 3, 3 are mutually drawn near at those and portions. When the cartridge C is inserted in such a condition, the the cartridge C pushes the slidable member 10 by the front part thereof to the innermost, and slant portions C*a* at the both front corners of the cartridge push apart the fitting projections 5*a*, and when the cartridge gets to the innermost the projections 5*a* are fit into notches C′ as shown in FIGS. 3 or 4 to hold the both sides thereof. In this connection, the elastic material 13 always acts to return back the cartridge C but the projections 5*a* strongly hold the cartridge at the determined position and the tape is reproduced under this condition. To take out the cartridge C the pushing part 18 is pushed so that the protrudes 7, 7 push the locking arms 3, 3 to rotate them reversely each other and consequently the fitting projections 5*a*, 5*a* are released in holding to push the slidable member 10 and the cartridge C. The thus extruded cartridge C is easily taken out.

In the embodiment shown in FIG. 4, the operating part 28 instead of the returning lever 8 is pushed to left and right (in this figure up and down). The supporter 5 of one locking arm 23 retreats to the outside of the cartridge C and at the same time the end portion of another locking arm 23 also retreats to release restraining to the notches C′. The other workings are similar to those said in FIGS. 1 to 3.

In FIGS. 5 to 7, the releasing rod 41 is placed on one side of the deck 100, and when it is pushed the receiving portion 66 formed in one locking arm 73 is pressed. Since this locking arm 73 and another holding arm 73 are engaged each other at the portions 57, another arm 73 rotates as the portion 57 is pushed to the front, and the projectins 55*a*, 55*a* are released from the notches C′, C′. Accordingly, the slidable member 60 and the cartridge C are pushed to the front by elasticity of the elastic material 63 and the thus extracted cartridge C is easily taken out with fingers. When the cartridge C is inserted, the portions 57, 57 of the arms 73, 73 are contacted to the cartridge C to rotate them against elasticity of the elastic material 6, and when the cartridge C is inserted to the determined position, the projections 55*a*, 55*a* are fit into the notches C′, C′ of the cartridge.

I claim:

1. A notched cartridge locking and ejecting mechanism consisting of a deck having a motor, capstan, and reproducing head, a cartridge supporting mechanism forming a receiving area for said cartridge.

a pair of locking arms arranged on said cartridge supporting mechanism and provided with an elastic material, the end portions of said arms projecting into said receiving area, and an ejecting mechanism engaging at the ends of said locking arms and having a return action with said elastic material;

wherein said arms are equipped with supporters capable of fitting into notches in the sides of the cartridge, whereby when the cartridge is inserted said supporters fit into said notches to hold the cartridge and said ejecting mechanism is operated to retract said supporters from said notches of the cartridge.

2. A mechanism as set forth in claim 1, wherein the cartridge supporting mechanism has a slidable member, an elastic material which engages said slidable member to form an extension to a front side of said mechanism, said slidable member has a catcher which projects into said receiving area, whereby when inserting the cartridge in said receiving area the cartridge engages said catcher and pushes said slidable member, extracting the cartridge from reproducing position by the return action of said elastic material acting on said slidable member when the locking arms are retracted from said receiving area by the ejecting mechanism.

3. A mechanism set forth in claim 1, including projections on said supporters capable of fitting into the notches of said cartridge.

4. A mechanism set forth in claim 1 wherein said locking arms are of an L-shape and pivotaly mounted on said deck, a spring is arranged between first end portions of said arms, and an ejecting lever is provided at the center of said cartridge receiving area and has projections on both sides to engage the other end portions of said respective arms.

5. A mechanism set forth in claim 4, including steps at the end portion of said ejecting lever and a return spring arranged on said steps.

6. A mechanism set forth in claim 1, including a holding frame formed in a box shape for said cartridge holding mechanism, said frame including a slidable member which is bent downwards in L-section, guide pins arranged in said slidable member in guide holes formed in said holding frame, and elastic material positioned between one of said guide pins and a portion of said holding frame.

7. A mechanism as set forth in claim 1 wherein said cartridge locking arms comprise a straight rod pivoted on the deck at its one end portion and a bar pivoted on the deck at its central portion, a basic portion of the locking arm pivoted on the deck at its central part and projecting from the deck as a handle, and a rod connecting the front and back sides of the pivoting points of said two arms.

8. A mechanism set forth in claim 1 wherein end portions of said two locking arms are bent downwards to provide engaging portions which are engaged to each other, and seats of U-shaped section at the center of said arms are rotatably supported on pivots projecting from the bottom of the deck.

9. A mechanism set forth in claim 1 wherein two holes are provided in said respective locking arms, a seat is formed at one side of said supporter, a stop means is in one of said holes and a stop means and a projection on the bottom of the seating is provided in the other of said holes so that said supporter is positioned.

10. A mechanism set forth in claim 1 wherein a receiving portion is provided at one side of one locking arm, an ejecting bar is provided at a supporting portion at one side of the holding mechanism, a spring is arranged on said ejecting rod, and one of said locking arms can be ejected by said ejecting rod.

* * * * *